United States Patent
Chandrashekar et al.

(10) Patent No.: US 11,098,805 B1
(45) Date of Patent: Aug. 24, 2021

(54) SHUTTLE VALVE WITH DETENT MECHANISM

(71) Applicant: The Boeing Company, Chicago, IL (US)

(72) Inventors: Vinay Kumar Tumkur Chandrashekar, Karnataka (IN); Keshava Prasad Pare Kooradka, Karnataka (IN); Naragaj K Nidagudi, Bengaluru (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/931,580

(22) Filed: May 13, 2020

(51) Int. Cl.
*F16K 11/044* (2006.01)
*F16K 11/07* (2006.01)

(52) U.S. Cl.
CPC ........ *F16K 11/044* (2013.01); *F16K 11/0712* (2013.01)

(58) Field of Classification Search
CPC . F16K 11/04; F16K 11/071; Y10T 137/86493
USPC ........................................................ 137/625
See application file for complete search history.

(56) References Cited

U.S. PATENT DOCUMENTS

| | | | | |
|---|---|---|---|---|
| 3,218,882 A * | 11/1965 | Stephens | .............. | G05G 5/06 74/527 |
| 3,285,284 A * | 11/1966 | Junck | .............. | F15B 13/04 137/624.27 |
| 3,602,245 A * | 8/1971 | Meisel | .............. | G05G 5/065 137/270 |
| 3,608,586 A * | 9/1971 | Daggy, Jr. | .............. | F15B 13/0402 137/625.65 |
| 3,939,870 A * | 2/1976 | Guigliano | .............. | F15B 13/0402 137/624.27 |
| 4,411,189 A * | 10/1983 | Miller | .............. | F15B 13/0417 137/596 |
| 4,538,641 A * | 9/1985 | Chatterjea | .............. | B62D 11/08 137/596.1 |
| 4,674,526 A * | 6/1987 | Athanassiu | .............. | F16K 11/044 137/113 |
| 4,796,860 A * | 1/1989 | Diel | .............. | F16K 11/0704 251/297 |
| 5,845,557 A * | 12/1998 | Speidel | .............. | B62D 5/083 91/375 A |
| 6,250,333 B1 * | 6/2001 | Breuning | .............. | B62D 5/083 137/625.21 |

\* cited by examiner

*Primary Examiner* — Kevin R Barss

(74) *Attorney, Agent, or Firm* — Duft & Bornsen, PC

(57) ABSTRACT

A shuttle valve and a method of fabricating a shuttle valve. In one embodiment, a shuttle valve comprises a casing having a first and second inlet ports, and an outlet port. The shuttle valve further comprises a sleeve disposed between the first and second inlet ports, a spool slidable within the sleeve along an axial line and having a plurality of detent grooves, and a C-spring. The sleeve has a spring retaining portion that includes at least one offset groove that is offset from the axial line. The C-spring is disposed in the offset groove, and engages one of the detent grooves on the spool.

20 Claims, 15 Drawing Sheets

SHUTTLE VALVE WITH DETENT MECHANISM

FIELD

This disclosure relates to the field of valves, and more particularly, to shuttle valves, switching valves, or the like.

BACKGROUND

Fluid power systems, such as pneumatic or hydraulic systems, commonly use valves to regulate or control the flow of fluid. In certain types of fluid power systems, the supply of fluid to a subsystem is from more than one source to meet system requirements. Thus, a shuttle valve may be implemented, which allows fluid to flow through it from one of two sources. A general shuttle valve includes a primary inlet port, a secondary inlet port, an outlet port, and a sliding part between the inlet ports, which is referred to as a spool or shuttle. A pressure differential between the inlet ports causes the spool to move, and allows flow from one of the inlet ports while blocking flow from the other. For instance, a higher pressure at the primary inlet port causes the spool to seat against the secondary inlet port, which seals off the secondary inlet port and allows fluid to flow from the primary inlet port and out the outlet port. A higher pressure at the secondary inlet port causes the spool to seat against the primary inlet port, which seals off the primary inlet port and allows fluid to flow from the secondary inlet port and out the outlet port.

Due to the variety of uses of shuttle valves, it is beneficial to continue to design improved shuttle valves.

SUMMARY

Described herein is a shuttle valve having an improved detent mechanism to hold the spool at different operating positions. As an overview, a shuttle cartridge is disposed in the shuttle valve between the inlet ports, and includes a sleeve and a spool slidable within the sleeve. The detent mechanism includes a C-spring that is retained in one or more offset grooves in the sleeve. The C-spring is configured to directly engage one of a plurality of detent grooves on the spool to hold the spool at a specific operating position. One technical benefit is that the design of the shuttle cartridge allows for easy assembly, replacement, and service of the shuttle valve. Another benefit is that the design of the shuttle cartridge has fewer parts than other shuttle valves, and is less likely to produce Foreign Object Debris (FOD) in the fluid path so that a filter or strainer is not needed. Yet another benefit is that the C-spring (e.g., stiffness of the C-spring) may be selected based on the pressure differential between inlet ports so that the shuttle valve may be used in a variety of applications.

One embodiment comprises a shuttle valve that includes a casing having a first inlet port, a second inlet port, and an outlet port. The shuttle valve further includes a sleeve disposed between the first inlet port and the second inlet port, a spool slidable within the sleeve along an axial line and having a plurality of detent grooves, and a C-spring. The sleeve has a spring retaining portion that includes at least one offset groove that is offset from the axial line, and the C-spring is disposed in the offset groove and engages one of the detent grooves.

In another embodiment, the spring retaining portion includes a first offset groove offset from the axial line, and a second offset groove offset from the axial line. The first offset groove and the second offset groove are in radially opposite directions.

In another embodiment, the spring retaining portion includes access slots disposed between the first offset groove and the second offset groove.

In another embodiment, the C-spring comprises a C-shaped body with open ends, and prongs disposed towards the ends that project radially inward.

In another embodiment, the C-spring elastically expands to disengage the one of the detent grooves when a pressure differential at the first inlet port and the second inlet port exceeds a threshold.

In another embodiment, a stiffness of the C-spring is selected based on a pressure differential applied to the shuttle valve.

Another embodiment comprises a shuttle cartridge of a shuttle valve. The shuttle cartridge comprises a sleeve having a spool bore, and a spool slidable within the spool bore along an axial line, and having a plurality of detent grooves. The shuttle cartridge further comprises a spring having a C-shaped body with open ends, and further having prongs disposed towards the ends that project radially inward. The spring is disposed in an offset groove of the sleeve with the prongs directly engaging one of the detent grooves.

In another embodiment, the sleeve includes a first offset groove offset from the axial line, and a second offset groove offset from the axial line in a radially opposite direction than the first offset groove.

In another embodiment, the sleeve includes access slots disposed between the first offset groove and the second offset groove.

In another embodiment, each of the prongs is rounded radially inward between one of the ends and the C-shaped body, and is rounded along a thickness of the spring.

In another embodiment, the spring is flat in an axial direction.

In another embodiment, the sleeve includes a stopper recess at each end of the sleeve, and the shuttle cartridge further includes a stopper disposed within the stopper recess.

Another embodiment comprises a method of fabricating a shuttle valve. The method comprises obtaining a sleeve having a spool bore centered on an axial line, and forming at least one offset groove in an inner cylindrical surface of the sleeve that is defined by the spool bore, where the offset groove is offset from the axial line. The method further comprises inserting a C-spring in the offset groove, and inserting a spool into the spool bore of the sleeve so that the C-spring engages a detent groove on the spool.

In another embodiment, the method further comprises obtaining a casing for the shuttle valve that includes a first inlet port, a second inlet port, an outlet port, and a longitudinal bore between the first inlet port and the second inlet port. The method further comprises inserting the sleeve into the longitudinal bore of the casing through the second inlet port, and attaching a port adapter to the second inlet port.

In another embodiment, forming the at least one offset groove in the inner cylindrical surface of the sleeve comprises forming a first offset groove and a second offset groove in the inner cylindrical surface that are in radially opposite directions.

In another embodiment, the method further comprises forming access slots between the first offset groove and the second offset groove.

In another embodiment, inserting the C-spring in the offset groove comprises inserting the C-spring through one of the access slots and into the first offset groove or the second offset groove.

In another embodiment, inserting the C-spring in the offset groove comprises selecting a stiffness of the C-spring based on a pressure differential applied to the shuttle valve.

In another embodiment, the shuttle valve is manufactured for an aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
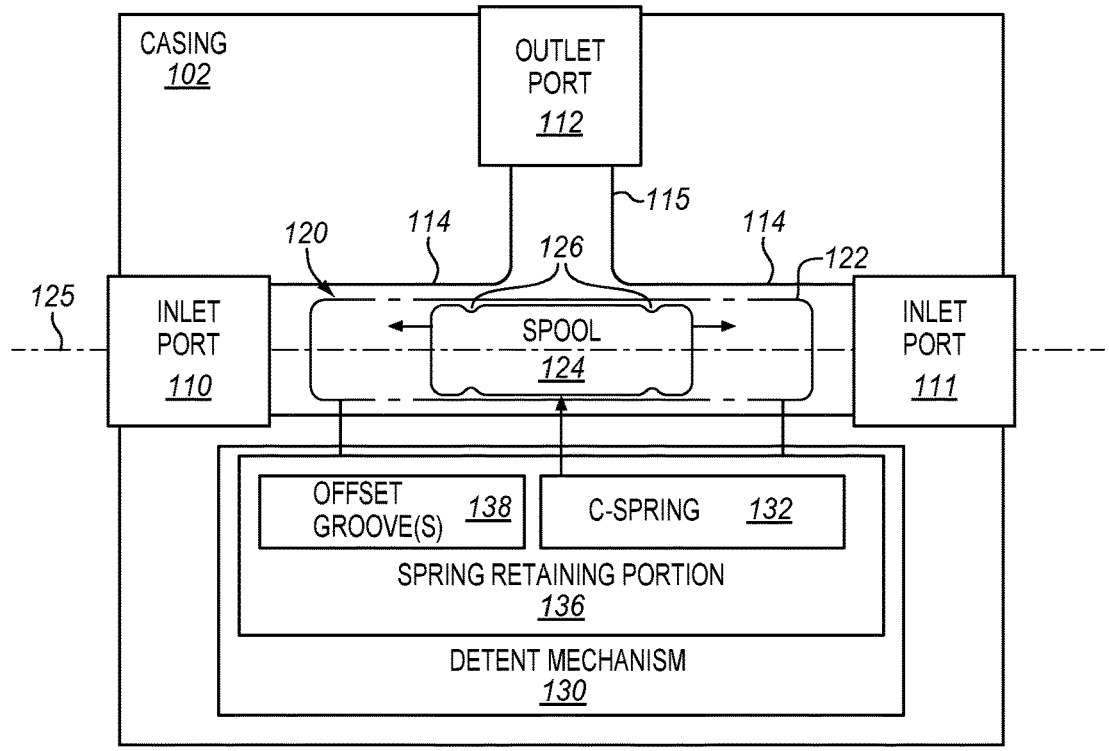
FIGS. 1-3 are schematic diagrams of a shuttle valve in an illustrative embodiment.
Figure 2:
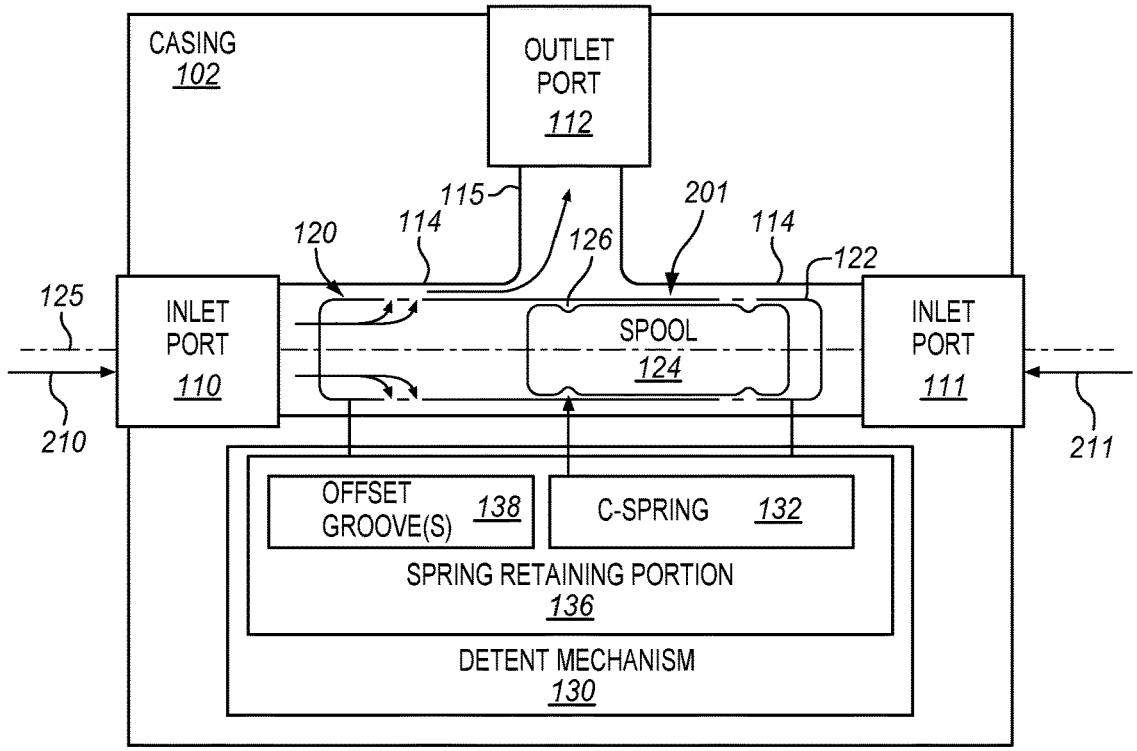
Figure 3:
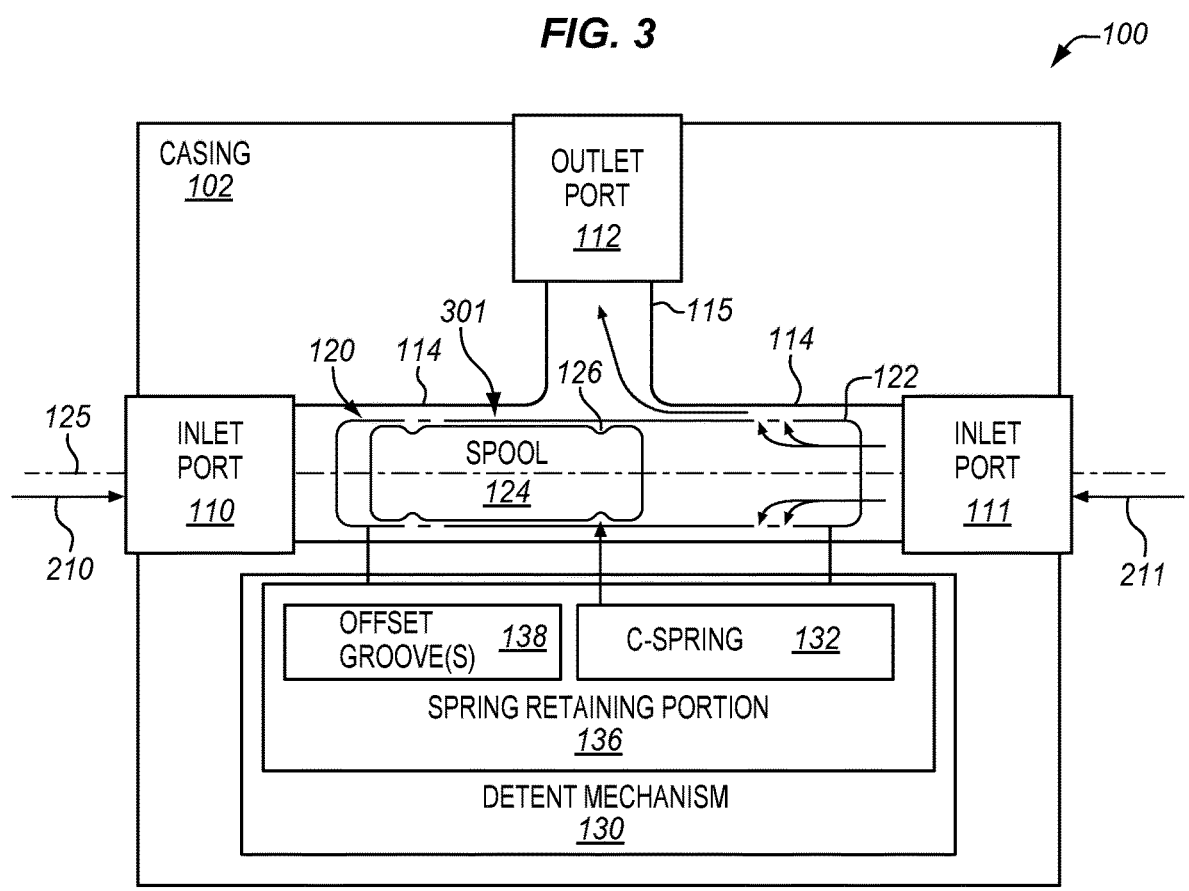

FIGS. 1-3 are schematic diagrams of a shuttle valve 100 in an illustrative embodiment. Shuttle valve 100 includes a casing 102 that houses the internal components of shuttle valve 100. Casing 102 has a unitary body that includes inlet ports 110-111 that are aligned coaxially on an axial line 125, and an outlet port 112. Casing 102 further includes a fluid passageway 114 that provides fluid communication between inlet port 110 and inlet port 111, and a fluid passageway 115 that provides fluid communication between outlet port 112 and inlet ports 110-111. Shuttle valve 100 has a modular construction that includes a removable shuttle cartridge 120 that is inserted or disposed in fluid passageway 114 between inlet port 110 and inlet port 111. Shuttle cartridge 120 includes a sleeve 122, and a spool 124 disposed within sleeve 122. Sleeve 122 is generally a hollow, cylindrical member centered on axial line 125. Spool 124 (also referred to as a shuttle) represents the slidable part of shuttle valve 100, which is slidable within sleeve 122 along axial line 125 in the directions indicated by the arrows. Axial line 125 may be referred to herein as the "sliding axis" for spool 124.

Shuttle valve 100 allows for a flow of fluid from inlet port 110 to outlet port 112, or from inlet port 111 to outlet port 112 depending on the operating position of spool 124. Spool 124 slides within sleeve 122 based on a pressure differential between inlet ports 110-111. For example, FIGS. 2-3 show an inlet pressure 210 (or fluid pressure) at inlet port 110, and an inlet pressure 211 at inlet port 111. When inlet pressure 210 is greater than inlet pressure 211, spool 124 shifts to the right along axial line 125 to a first operating position 201 where inlet port 111 is blocked, and fluid is allowed to flow from inlet port 110 to outlet port 112 (see FIG. 2). When inlet pressure 211 is greater than inlet pressure 210, spool 124 shifts to the left along axial line 125 to a second operating position 301 where inlet port 110 is blocked, and fluid is allowed to flow from inlet port 111 to outlet port 112 (see FIG. 3).

In this embodiment, shuttle valve 100 is a "biased" shuttle valve that incorporates a detent mechanism 130 to hold spool 124 at the first operating position 201 or the second operating position 301. Spool 124 includes a plurality of detent grooves 126, which are annular grooves spaced along the length of spool 124. Detent mechanism 130 is configured to engage a detent groove 126 to hold spool 124 at a different operating position 201/301 along axial line 125. In this embodiment, detent mechanism 130 includes a C-spring 132 that directly engages one of the detent grooves 126 on spool 124. C-spring 132 (also referred to as a C-clip, C-ring, or detent spring) is a C-shaped member configured to elastically expand in a radial direction. Sleeve 122 includes a spring retaining portion 136 that includes one or more offset grooves 138. As will be described in more detail below, an offset groove 138 is a semicircular groove in an inner cylindrical surface of sleeve 122 that is offset from axial line 125. C-spring 132 is disposed in an offset groove 138 of sleeve 122, and directly engages (i.e., directly touches or contacts) one of the detent grooves 126 on spool 124. Engagement of C-spring 132 with a detent groove 126 on spool 124 acts against inlet pressure 210/211 at an inlet port 110/111, and prevents spool 124 from moving along axial line 125. A high enough pressure differential at inlet ports 110-111 (i.e., a pressure differential that exceeds a threshold) is able to overcome the spring force of C-spring 132 to cause C-spring 132 to elastically expand and disengage from a detent groove 126 on spool 124. Thus, spool 124 is able to move along axial line 125 between the first operating position 201 and the second operating position 301.

The shuttle valve 100 illustrated in FIGS. 1-3 may be referred to as a three-way, two position valve. However, spool 124 may have more than two operating positions within shuttle valve 100 in other embodiments. Also, shuttle valve 100 may have more inlet ports and outlet ports in other embodiments.

Figure 4:
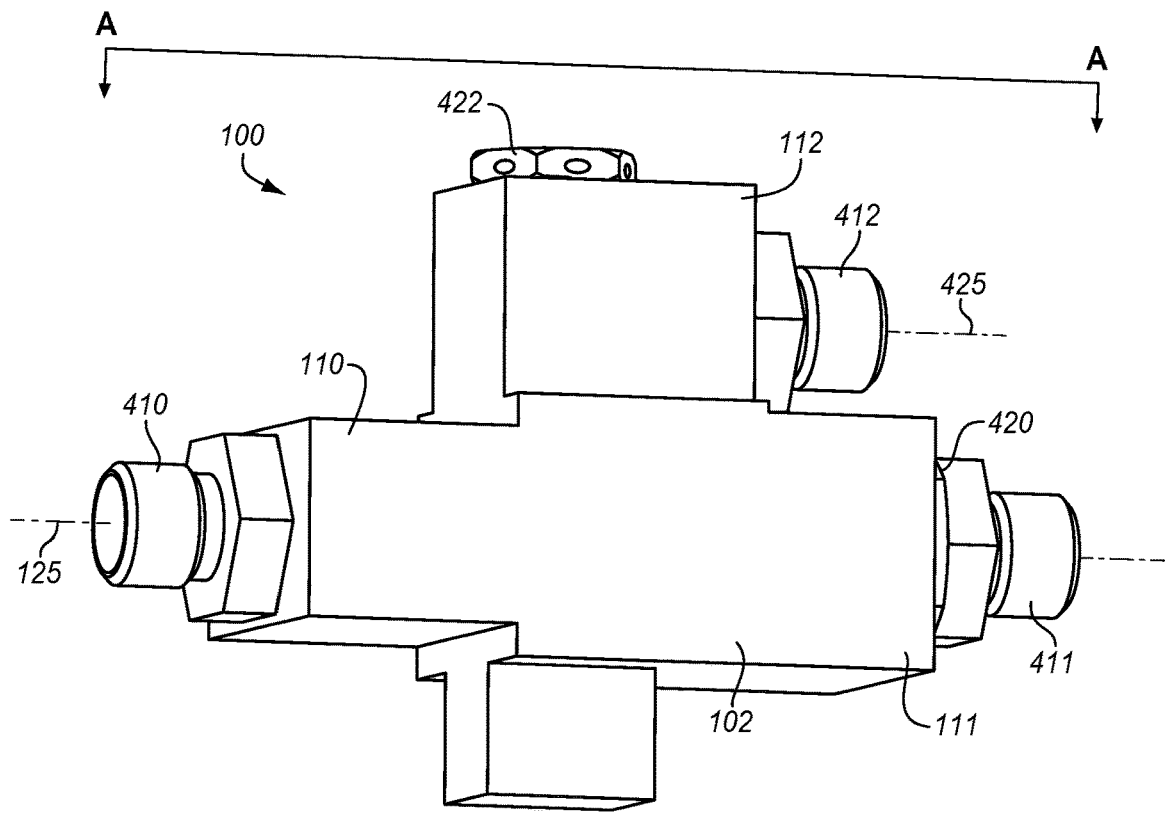
FIGS. 4, 5A, and 5B are perspective views of a shuttle valve in an illustrative embodiment.
Figure 5A:
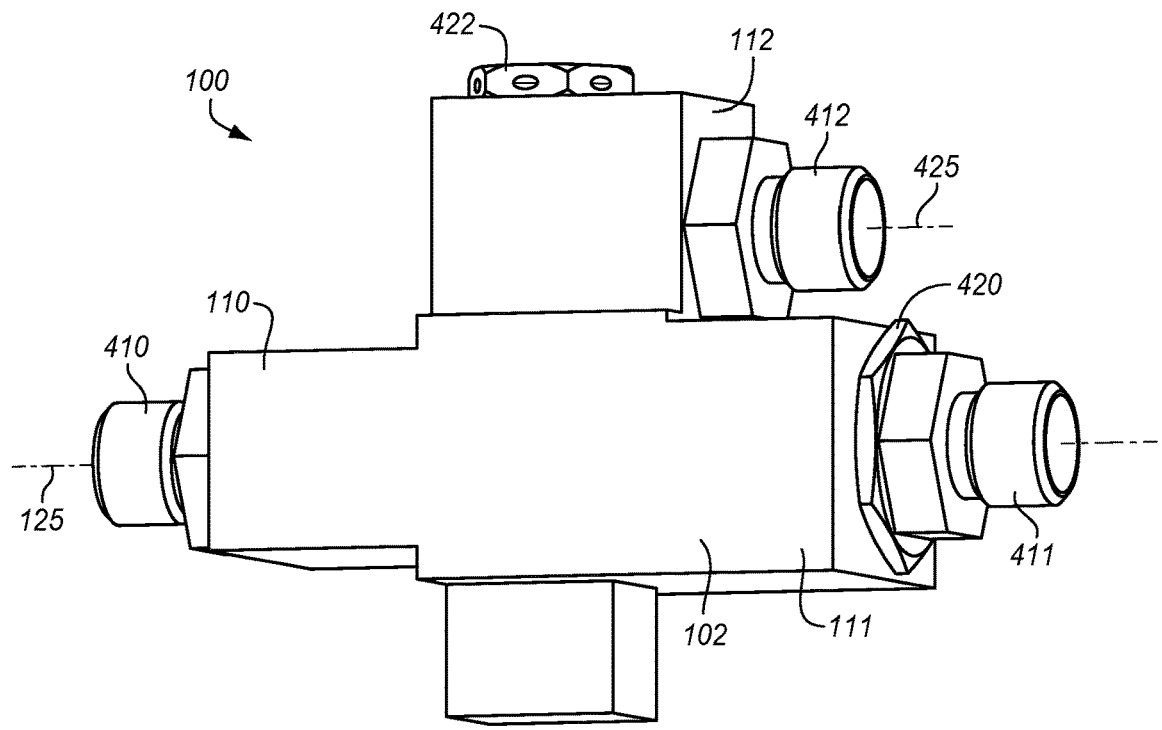
Figure 5B:
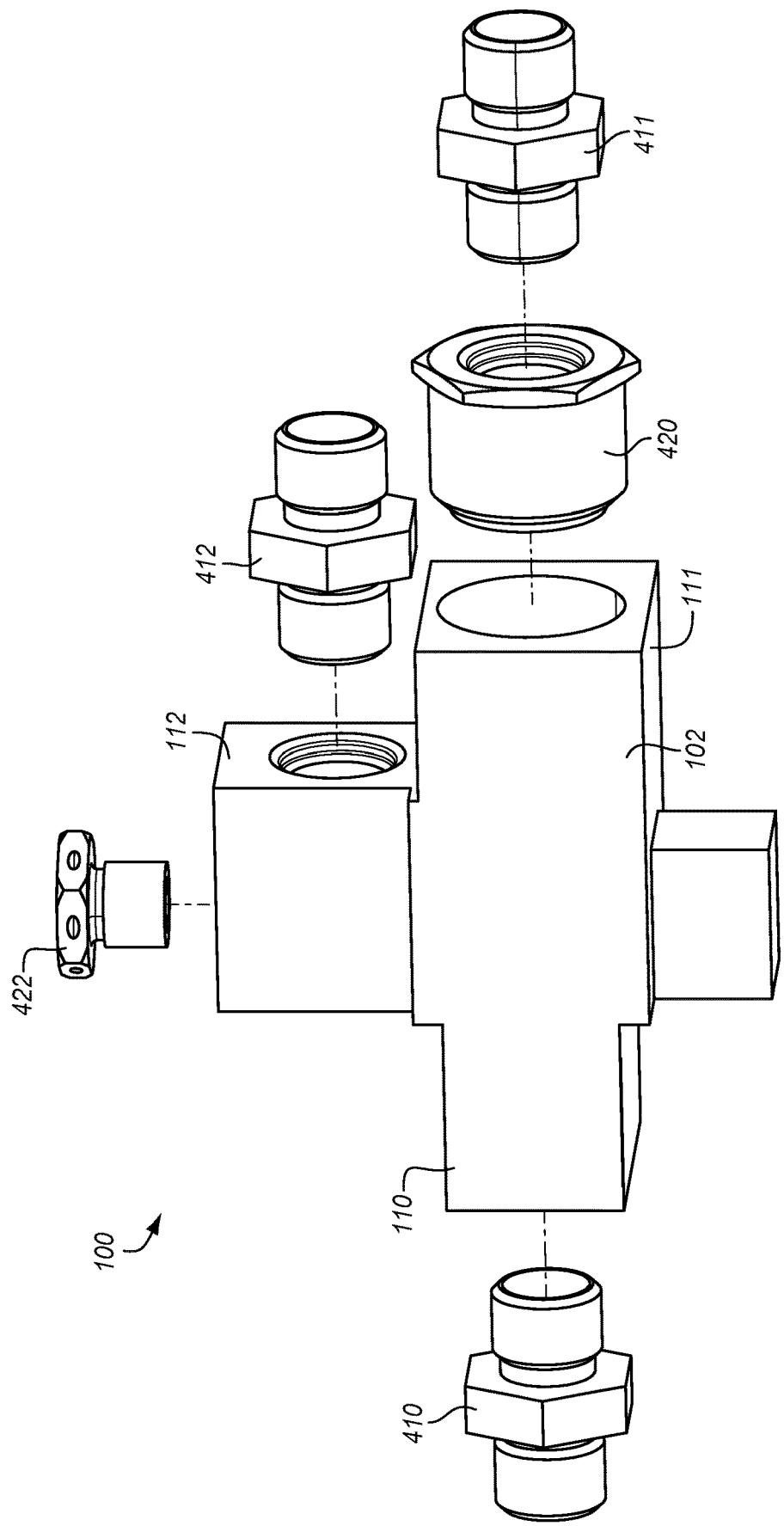

The following provides a structural example of shuttle valve 100. FIGS. 4, 5A, and 5B are perspective views of shuttle valve 100 in an illustrative embodiment. As above, casing 102 includes inlet ports 110-111 that are coaxial and centered on axial line 125, and outlet port 112. In this embodiment, outlet port 112 is centered on an axial line 425, which is parallel with axial line 125. In other embodiments, axial line 425 may be perpendicular with axial line 125, or may be angled with respect to axial line 125. A hose fitting 410 is installed at inlet port 110, a port adapter 420 and a hose fitting 411 are installed at inlet port 111, and a hose fitting 412 is installed at outlet port 112. Hose fittings 410-412 are used to connect shuttle valve 100 to hose pipes or the like, such as in a hydraulic circuit, a pneumatic circuit, etc. Port adapter 420 is connected or coupled at inlet port 111, which will be described in more detail below. Shuttle valve 100 further includes a plug 422 that caps a bore within casing 102, which will be described in more detail below. FIG. 5B is a partially exploded view of shuttle valve 100 to further illustrate hose fittings 410-412, port adapter 420, and plug 422.

Figure 6:
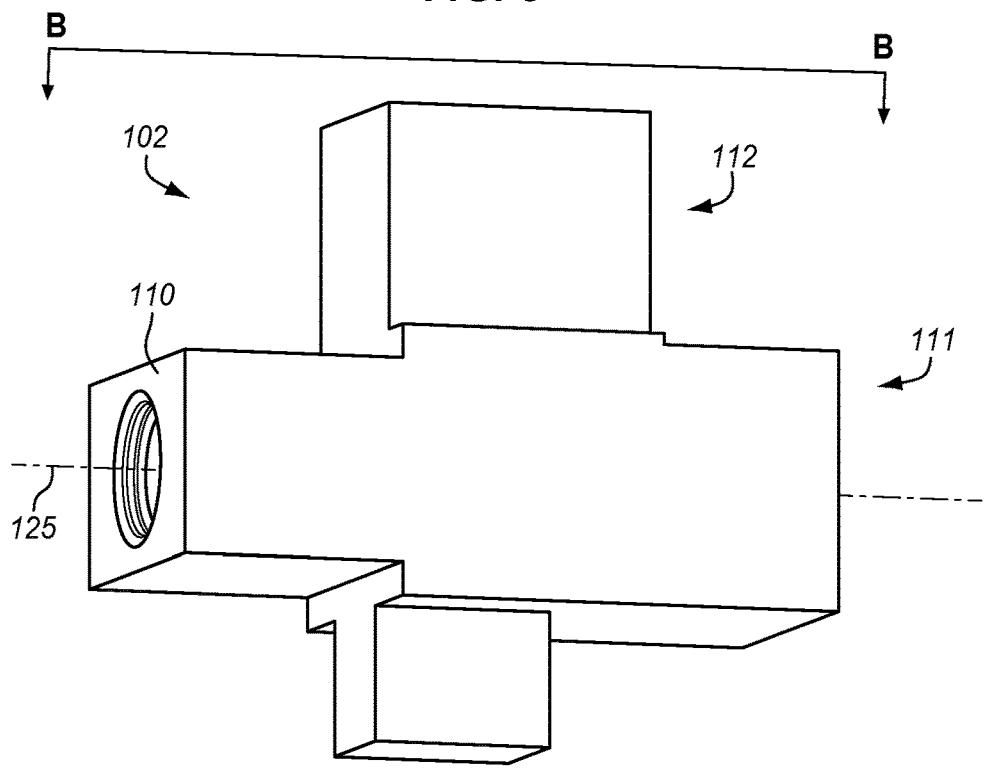
FIG. 6 is a perspective view of a casing in an illustrative embodiment.
Figure 7:
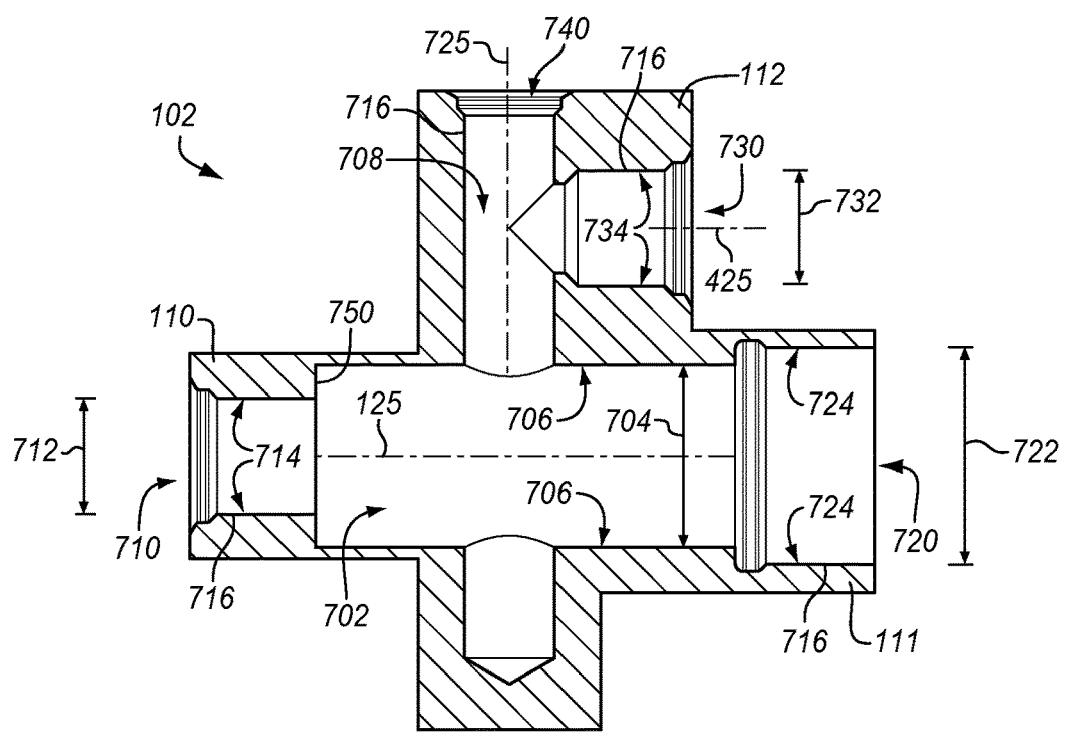
FIG. 7 is a cross-sectional view of a casing in an illustrative embodiment.

FIG. 6 is a perspective view of casing 102, and FIG. 7 is a cross-sectional view of casing 102 in an illustrative embodiment. The view in FIG. 7 is across cut-line B-B in FIG. 6. Casing 102 is made from a rigid material. For example, casing 102 may be cast from metal, molded or otherwise formed from plastic, or formed from another material. Inlet port 110 has a cylindrical bore 710 centered on axial line 125, and has a diameter 712. At least a portion of the inner cylindrical surface 714 of inlet port 110 may include threads 716 to couple with a hose fitting 410 or the like. Inlet port 111 has a cylindrical bore 720 centered on axial line 125, and has a diameter 722. At least a portion of the inner cylindrical surface 724 of inlet port 111 may include threads 716 to couple with a port adapter 420 or the like. The diameter 722 of the cylindrical bore 720 of inlet port 111 is shown as being larger than the diameter 712 of the cylindrical bore 710 of inlet port 110. The larger size of the cylindrical bore 720 of inlet port 111 allows for shuttle cartridge 120 to be inserted or removed through inlet port 111. Outlet port 112 has a cylindrical bore 730 centered on axial line 425, and has a diameter 732. At least a portion of the inner cylindrical surface 734 of outlet port 112 may include threads 716 to couple with a hose fitting 412 or the like.

In FIG. 7, casing 102 includes additional cylindrical bores or cylindrical channels that define the fluid passageways 114-115 (see also, FIG. 1). More particularly, casing 102 includes a longitudinal bore 702 centered on axial line 125 that forms a fluid path between inlet ports 110-111 where the valve functionality is implemented in the form of sleeve 122 and spool 124. The diameter 704 of longitudinal bore 702 is sized to fit shuttle cartridge 120. The diameter 704 of longitudinal bore 702 is larger than the diameter 712 of the cylindrical bore 710 at inlet port 110 to form or define an interface surface 750 for sleeve 122 that faces toward inlet port 111. The diameter 704 of longitudinal bore 702 may be similar or smaller than the diameter 722 of the cylindrical bore 720 at inlet port 111. The inner cylindrical surface 706 of longitudinal bore 702 may be generally smooth to accommodate shuttle cartridge 120.

Casing 102 further includes a transverse bore 708 centered on axial line 725 that is transverse to axial line 125. Transverse bore 708 intersects longitudinal bore 702, and forms a fluid path between longitudinal bore 702 and outlet port 112. The end of transverse bore 708 opposite longitudinal bore 702 includes a plug hole 740 configured to receive plug 422. At least a portion of the plug hole 740 may include threads 716 to couple with plug 422.

Figure 8:
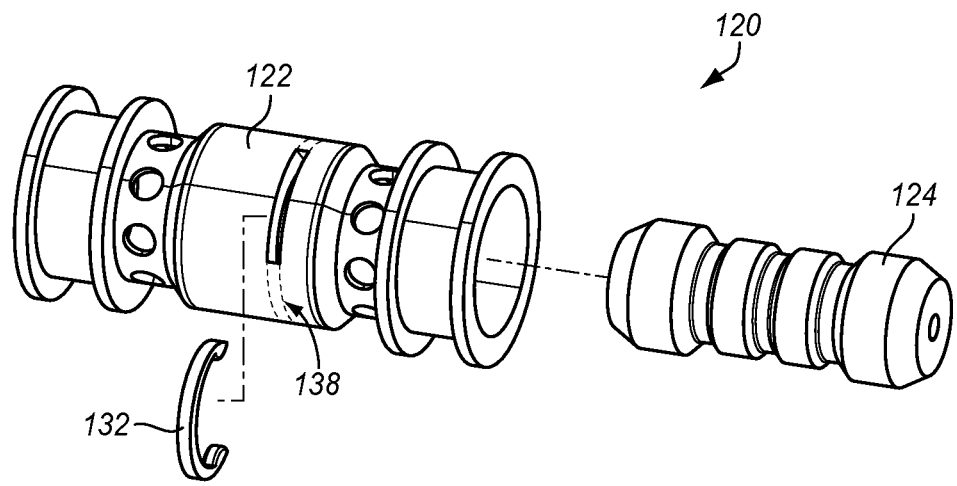
FIG. 8 is an exploded, perspective view of a shuttle cartridge in an illustrative embodiment.
Figure 9:
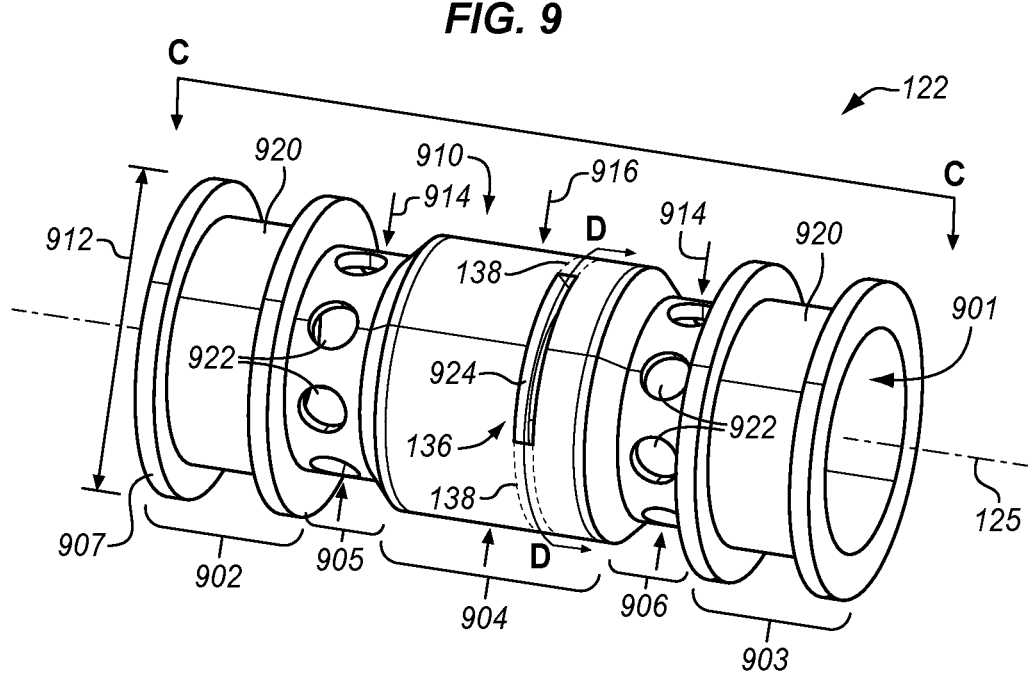
FIG. 9 is a perspective view of a sleeve in an illustrative embodiment.
Figure 10:
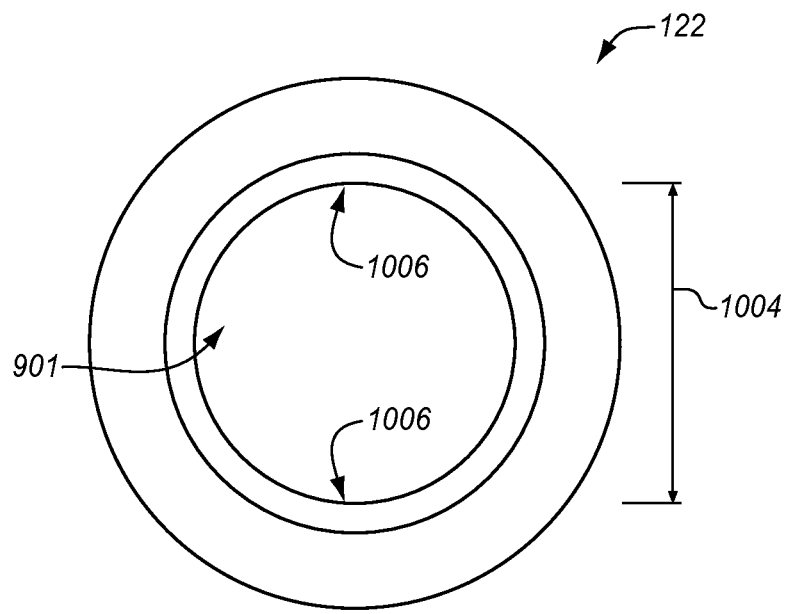
FIG. 10 is a side view of a sleeve in an illustrative embodiment.

FIG. 8 is an exploded, perspective view of shuttle cartridge 120 in an illustrative embodiment. Shuttle cartridge 120 is an assembly that includes sleeve 122, spool 124, and C-spring 132. Spool 124 is insertable into sleeve 122, and C-spring 132 is fitted into an offset groove 138 in sleeve 122 to hold spool 124 at different operating positions within sleeve 122, as is described in more detail below. FIG. 9 is a perspective view of sleeve 122, and FIG. 10 is a side view of sleeve 122 in an illustrative embodiment. In FIG. 9, sleeve 122 includes a cylindrical body 907 having an outer peripheral surface 910, and a spool bore 901 disposed longitudinally (i.e., along its length). Spool bore 901 is a cylindrical aperture disposed longitudinally and is centered on axial line 125. As shown in FIG. 10, the diameter 1004 of spool bore 901 is sized to fit spool 124, and the inner cylindrical surface 1006 of sleeve 122 may be generally smooth to accommodate sliding of spool 124 within spool bore 901. In FIG. 9, sleeve 122 includes end sections 902-903, a middle section 904, and fluid port sections 905-906. The outer peripheral surface 910 of sleeve 122 varies along its length. In this embodiment, end sections 902-903 have an outer diameter 912, which corresponds with the diameter 704 of longitudinal bore 702 in casing 102 (see FIG. 7). For example, the outer diameter 912 of end sections 902-903 may be slightly less than the diameter 704 of longitudinal bore 702 so that sleeve 122 is insertable in longitudinal bore 702 with a clearance fit. In another example, the outer diameter 912 of end sections 902-903 may be substantially similar to the diameter 704 of longitudinal bore 702 so that sleeve 122 is insertable in longitudinal bore 702 with a push fit. End sections 902-903 each include a seal groove 920 that is configured to receive a seal member, such as an O-ring, an annular gasket, or the like.

Fluid port sections 905-906 have a reduced outer diameter 914 in comparison to the outer diameter 912 of end sections 902-903. Fluid port sections 905-906 are perforated with one or more fluid ports 922 that extend between spool bore 901 and outer peripheral surface 910. Thus, fluid that enters spool bore 901 from either end of sleeve 122 is able to pass through fluid ports 922 to exit sleeve 122.

Figure 11:
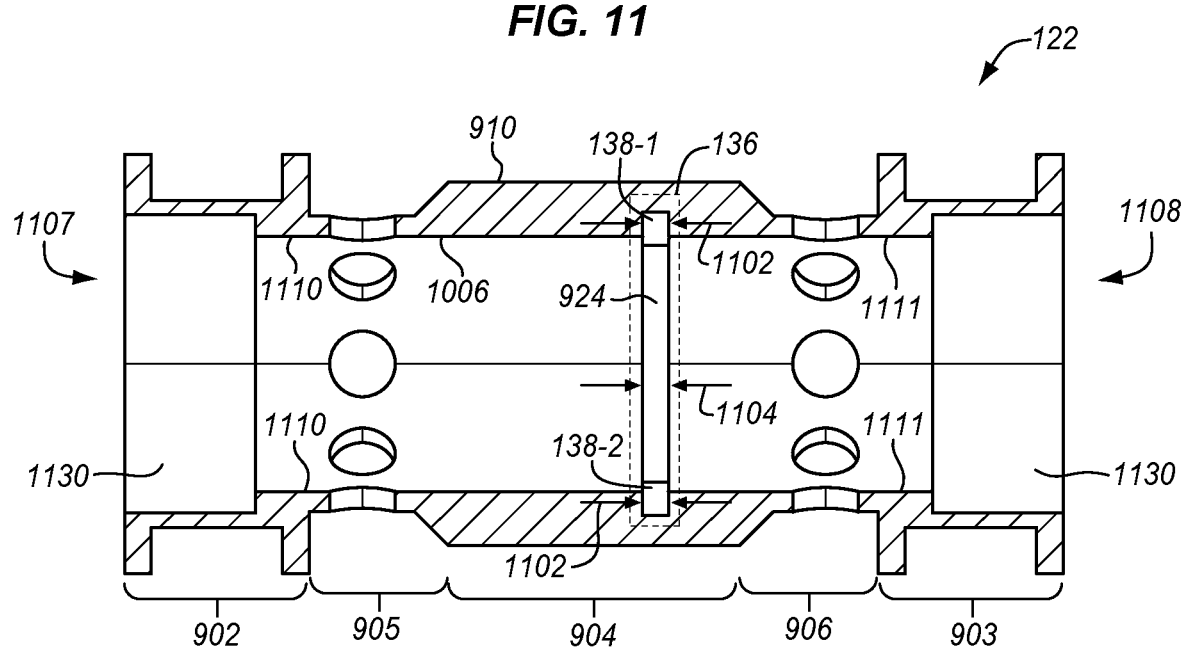
FIGS. 11-13 are cross-sectional views of a sleeve in an illustrative embodiment.
Figure 12:
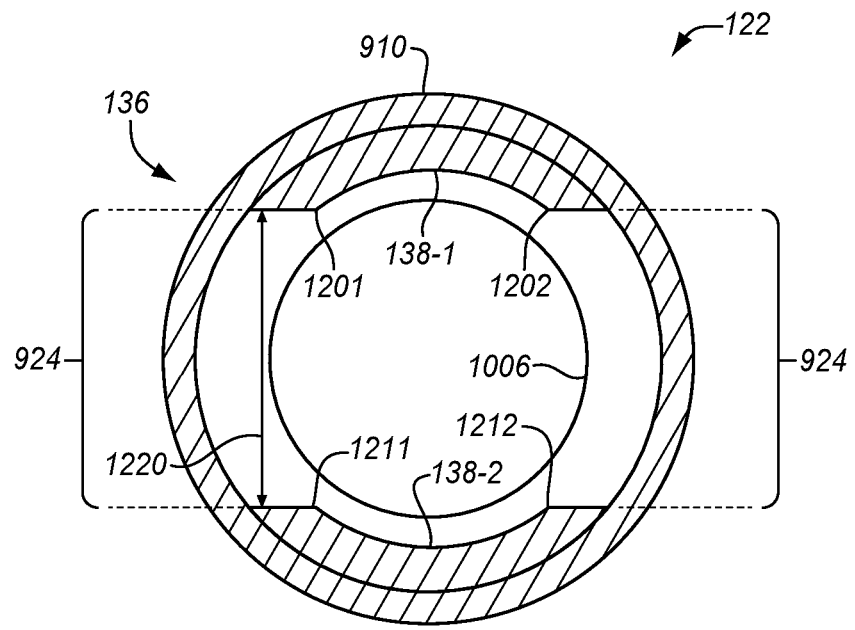
Figure 13:
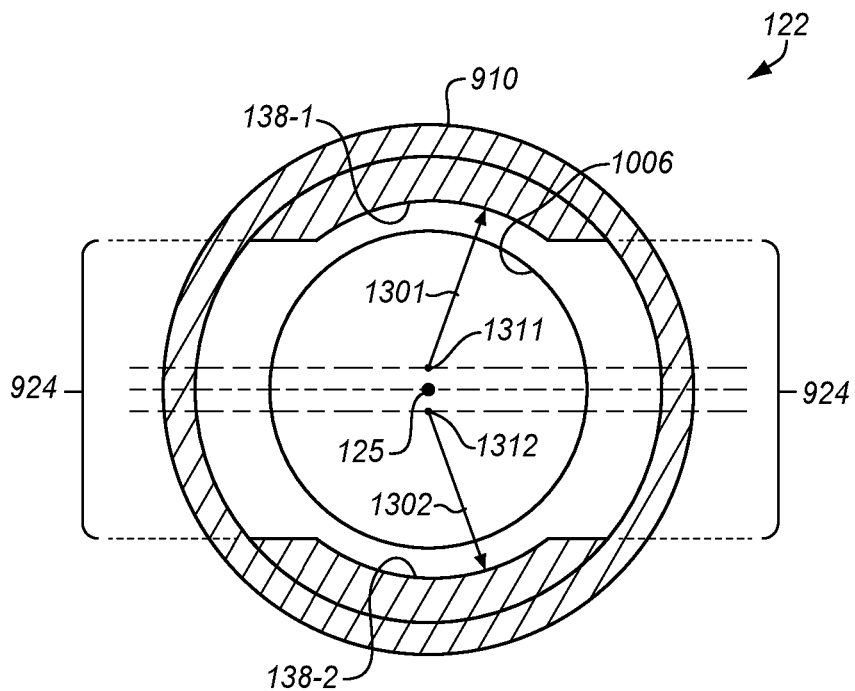

Middle section 904 may also have a reduced outer diameter 916 in comparison to the outer diameter 912 of end sections 902-903. Middle section 904 also includes the spring retaining portion 136. As will be shown in FIGS. 11-13, spring retaining portion 136 includes offset grooves 138, and access slots 924 in one embodiment. FIGS. 11-13 are cross-sectional views of sleeve 122 in an illustrative embodiment. The view in FIG. 11 is across cut plane C-C in FIG. 9, and the view in FIGS. 12-13 is across cut plane D-D in FIG. 9. In FIG. 11, offset grooves 138-1 and 138-2 are cut or otherwise formed into the inner cylindrical surface 1006 of sleeve 122. Each of offset grooves 138-1 and 138-2 has a width 1102 in the axial direction. An access slot 924 is an elongated cut or aperture along a circumferential segment of sleeve 122. An access slot 924 is formed from outer peripheral surface 910 of sleeve 122 through to the inner cylindrical surface 1006, and provides an opening for inserting C-spring 132 in an offset groove 138. Access slot 924 has a width 1104 (in the axial direction), which may be substantially similar to the width 1102 of an offset groove 138 or may be larger than the width 1102 of an offset groove 138.

Also shown in FIG. 11 are spool seats 1110-1111 defined by inner cylindrical surface 1006 at end sections 902-903. Spool seats 1110-1111 represent the portion of inner cylindrical surface 1006 that interfaces with spool 124 to block flow of fluid into sleeve 122. Sleeve 122 also includes a stopper recess 1130 at each end 1107-1108 of sleeve 122. Stopper recess 1130 is a cylindrical recess that is configured to receive a stopper, as is further illustrated in FIG. 20.

In FIG. 12, spring retaining portion 136 is illustrated as having two offset grooves 138-1 and 138-2 that are formed in radially opposite directions. For example, one offset groove 138-1 is disposed toward the top of sleeve 122, and the other offset groove 138-2 is disposed toward the bottom of sleeve 122. However, the number and positioning of offset grooves 138 may vary as desired. Access slots 924 are disposed between offset grooves 138-1 and 138-2. For example, one access slot 924 is disposed between an end 1201 of offset groove 138-1 and an end 1211 of offset groove 138-2, and another access slot 924 is disposed between the other end 1202 of offset groove 138-1 and the other end 1212 of offset groove 138-2. Each access slot 924 has a length 1220 (circumferentially) that is slightly larger than a width of C-spring 132 so that C-spring 132 may be installed into an offset groove 138 through an access slot 924.

Figure 14:
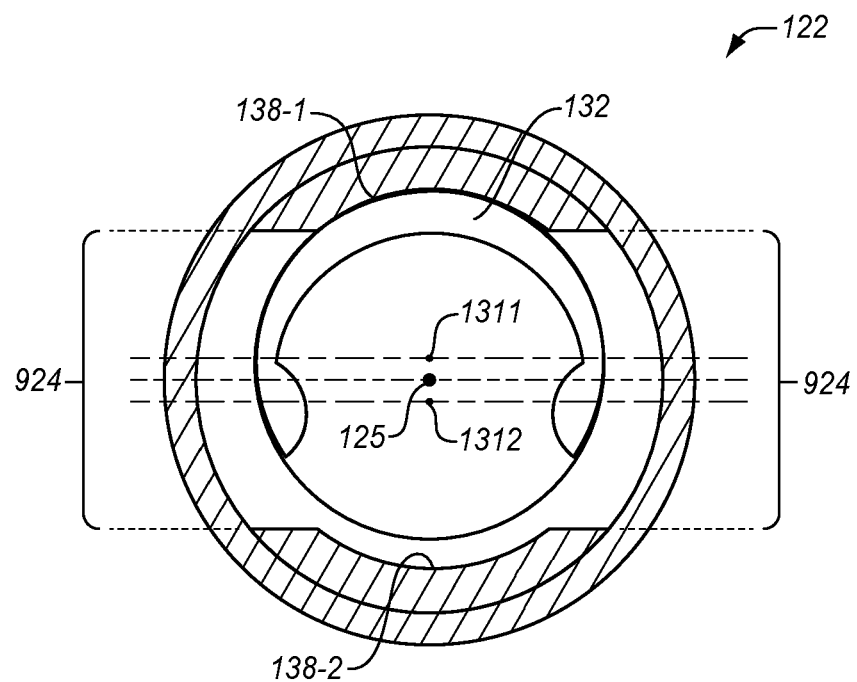
FIGS. 14-15 are cross-sectional views of a sleeve with a C-spring installed in an illustrative embodiment.
Figure 15:
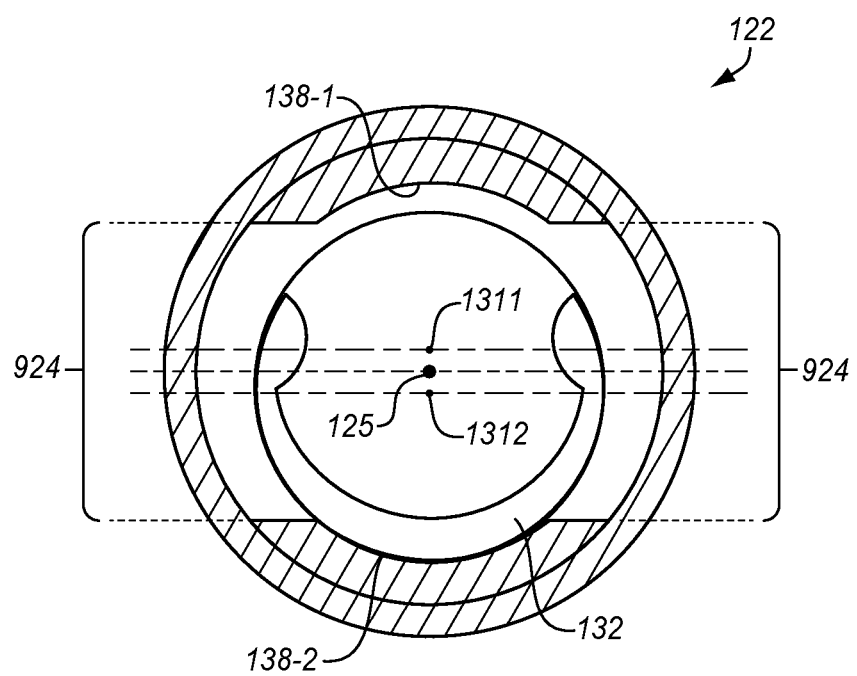

Offset grooves 138-1 and 138-2 are offset from the axial line 125 defined by sleeve 122. In FIG. 13, sleeve 122 is centered on axial line 125. Offset groove 138-1 is a semicircular groove having a radius 1301, and is centered on an axial line 1311 that is offset from axial line 125. Offset groove 138-2 is a semicircular groove having a radius 1302, and is centered on an axial line 1312 that is offset from axial line 125. The radii 1301-1302 of offset grooves 138-1 and 138-2 and the amount of offset of axial lines 1311-1312 may be the same in one embodiment. One technical benefit of the configuration of offset grooves 138-1 and 138-2 as shown in FIGS. 12-13 is that C-spring 132 cannot fall out of sleeve 122 when spool 124 is inserted within sleeve 122, and C-spring 132 may be held at any angle of rotation within sleeve 122. FIGS. 14-15 are cross-sectional views of sleeve 122 with C-spring 132 installed in an illustrative embodiment. In FIG. 14, C-spring 132 is disposed within offset groove 138-1. In FIG. 15, C-spring 132 is rotated approximately 180 degrees, and is disposed within offset groove 138-2. However, there may be one offset groove 138 in other embodiments, such as when C-spring 132 is not allowed to rotate within sleeve 122.

Although the embodiments above described one C-spring 132 and one spring retaining portion 136 in sleeve 122, there may be multiple C-springs 132 and spring retaining portions 136 in sleeve 122 in other embodiments.

Figure 16:
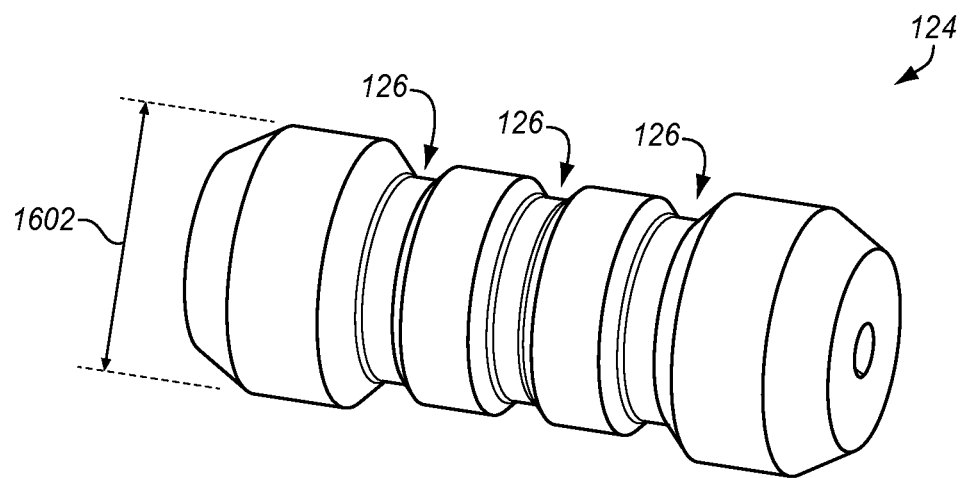
FIG. 16 is a perspective view of a spool in an illustrative embodiment.

FIG. 16 is a perspective view of spool 124 in an illustrative embodiment. Spool 124 is an elongated member having a plurality of detent grooves 126. Detent grooves 126 are annular or circumferential grooves spaced along the length of spool 124. Detent grooves 126 may be rounded or semi-circular, beveled, chamfered, V-shaped, etc., in the axial direction. Spool 124 has a diameter 1602 that is less than the diameter 1004 of spool bore 901 within sleeve 122 so that spool 124 is able to slide within spool bore 901 along axial line 125.

Figure 17:
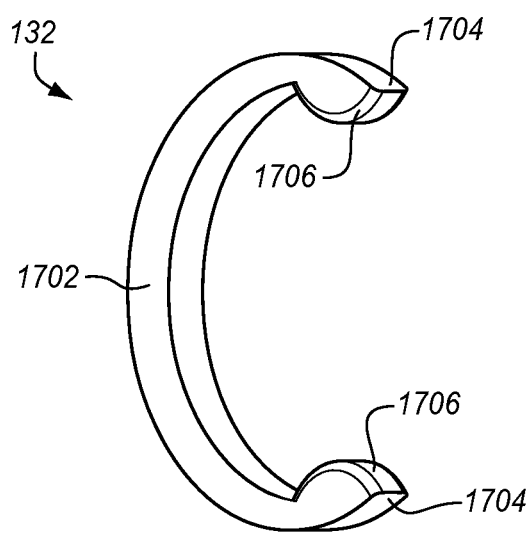
FIG. 17 is a perspective view of a C-spring in an illustrative embodiment.
Figure 18:
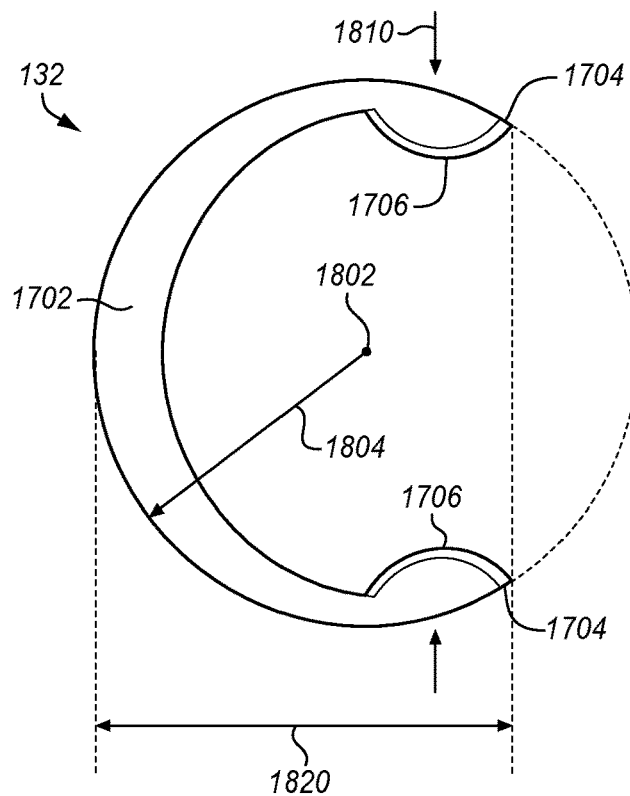
FIG. 18 is a plan view of a C-spring in an illustrative embodiment.
Figure 19:
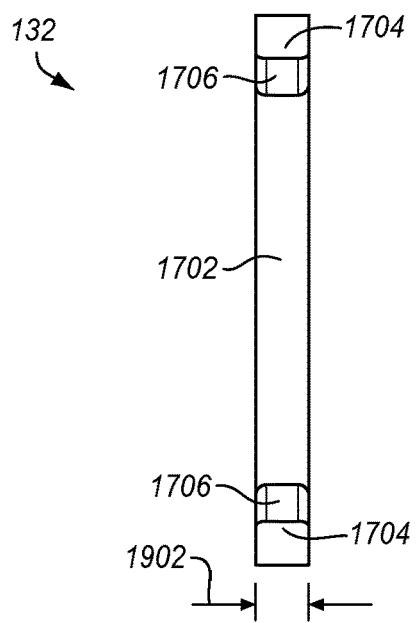
FIG. 19 is a front view of a C-spring in an illustrative embodiment.

FIG. 17 is a perspective view of C-spring 132 in an illustrative embodiment. C-spring 132 is a monolithic part that is configured to be inserted in an offset groove 138 of sleeve 122, and engage a detent groove 126 on spool 124. C-spring 132 has a ring-shaped or C-shaped body 1702 with open ends 1704. C-spring 132 includes prongs 1706 disposed at or proximate ends 1704. A prong 1706 is a groove-engaging part that projects radially inward, and faces spool 124 when installed in an offset groove 138. C-spring 132 is made from a semi-flexible material, such as metal, so that ends 1704 are able to elastically deflect, expand, or deform radially outward in response to a pressure differential applied to spool 124 along axial line 125. FIG. 18 is a plan view of C-spring 132 in an illustrative embodiment. The outer profile of C-spring 132 is generally circular in this embodiment about a center axis 1802 as illustrated by the imaginary circle that encircles C-spring 132, and has an outer radius 1804. C-spring 132 has a width 1820 that is slightly less than the length 1220 of an access slot 924 (see also, FIG. 12) so that C-spring 132 may be inserted into an offset groove 138 through access slot 924. The shape of prongs 1706 may be rounded or curved radially inward between an end 1704 and C-shaped body 1702 as shown in FIG. 18 to facilitate engagement/disengagement with a detent groove 126 on spool 124. The stiffness 1810 of C-spring 132 represents the extent to which C-spring 132 resists deformation radially outward. FIG. 19 is a front view of C-spring 132 in an illustrative embodiment. C-spring 132 is generally flat in the axial direction, and has a thickness 1902 that is less than the width 1102 of an offset groove 138 and the width 1104 of an access slot 924. As is illustrated in FIG. 19, prongs 1706 may be rounded or curved in the axial direction along the thickness 1902 of C-spring 132.

Figure 20:
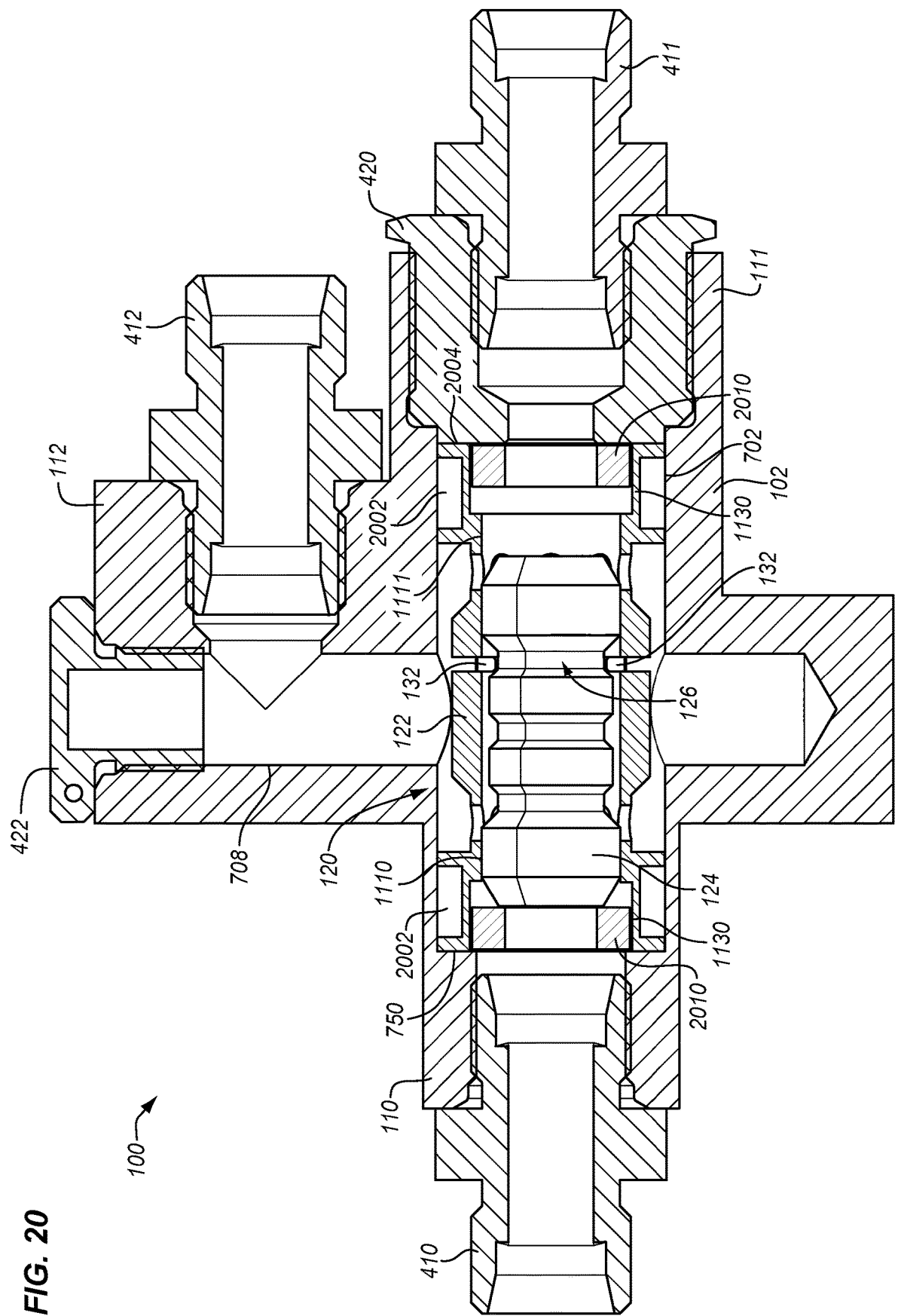
FIG. 20 is a cross-sectional view of a shuttle valve in an illustrative embodiment.

FIG. 20 is a cross-sectional view of shuttle valve 100 in an illustrative embodiment. The view in FIG. 20 is across cut-line A-A in FIG. 4. Shuttle cartridge 120 is assembled by placing C-spring 132 within an offset groove 138 (not visible in FIG. 20) of sleeve 122, such as through an access slot 924. When C-spring 132 is seated in an offset groove 138, spool 124 is inserted in sleeve 122 so that C-spring 132 engages a detent groove 126 on spool 124. With shuttle cartridge 120 assembled, it is inserted into longitudinal bore 702 of casing 102 through inlet port 111. One end of sleeve 122 abuts interface surface 750. A seal member 2002 is installed in seal grooves 920 of sleeve 122 to provide a seal with the inner cylindrical surface 706 of longitudinal bore 702 in casing 102 (see also, FIG. 7). Port adapter 420 is inserted or installed at inlet port 111 so that sleeve 122 is interposed between interface surface 750 and an end 2004 of port adapter 420. Hose fitting 410 is inserted or attached at inlet port 110, hose fitting 411 is inserted or attached at port adapter 420, and hose fitting 412 is inserted or attached at outlet port 112.

Further illustrated is a stopper 2010 disposed within a stopper recess 1130 at either end of sleeve 122. Stopper 2010 is an annular member (e.g., an O-ring) that provides positive stopping of spool 124 when it switches between operating positions.

In operation, spool 124 is able to move between two operating positions. When inlet pressure (i.e., fluid pressure) at inlet port 111 is higher than inlet pressure at inlet port 110 by a threshold (e.g., 300 psi), the force from the fluid causes C-spring 132 to radially expand and spool 124 is moved to the left as shown in FIG. 20 where C-spring 132 engages with a detent groove 126 of spool 124 (e.g., the rightmost detent groove 126). In this position, spool 124 seats against spool seat 1110 at one end of sleeve 122 and blocks fluid port section 905 of sleeve 122 (see also, FIG. 9). Spool 124 therefore blocks inlet port 110 and allows fluid to flow from inlet port 111 to outlet port 112. When inlet pressure at inlet port 110 is higher than inlet pressure at inlet port 111 by a threshold, the force from the fluid causes C-spring 132 to radially expand and spool 124 is moved to the right (not shown) where C-spring 132 engages with another detent groove 126 of spool 124 (e.g., the leftmost detent groove 126). In this position, spool 124 seats against spool seat 1111 at the other end of sleeve 122 and blocks fluid port section 906 of sleeve 122 (see also, FIG. 9). Spool 124 therefore blocks inlet port 111 and allows fluid to flow from inlet port 110 to outlet port 112.

This structure of shuttle valve 100 provides multiple benefits. For one, shuttle cartridge 120 may be easily assembled for a shuttle valve 100, and shuttle valve 100 may be serviced by removal and replacement of shuttle cartridge 120. Also, C-spring 132 or shuttle cartridge 120 may be replaced based on a particular application of shuttle valve 100. For example, a different C-spring 132 or shuttle cartridge 120 may be used depending on pressures applied within a fluid power system. When higher pressures are applied, a thicker or stiffer C-spring 132 may be used in shuttle cartridge 120 to hold spool 124 at a desired operating position. When lower pressures are applied, a thinner or more elastic C-spring 132 may be used in shuttle cartridge 120. The stiffness of C-spring 132 may therefore be selected based on the pressure differential applied at inlet ports 110-111 for switching the operating position of spool 124.

Another benefit is that shuttle cartridge 120 has fewer parts as compared to other shuttle valves 100. In shuttle cartridge 120, C-spring 132 directly engages a detent groove 126 on spool 124 to hold spool 124 at an operating position as illustrated in FIG. 20. C-spring 132 is a monolithic part so that prongs 1706 of C-spring 132 engage a detent groove 126. With fewer parts, there is a lesser chance of part failure resulting in debris entering the fluid path. Thus, a strainer or filter is not needed in the fluid passageway 115 to outlet port 112.

Figure 21:
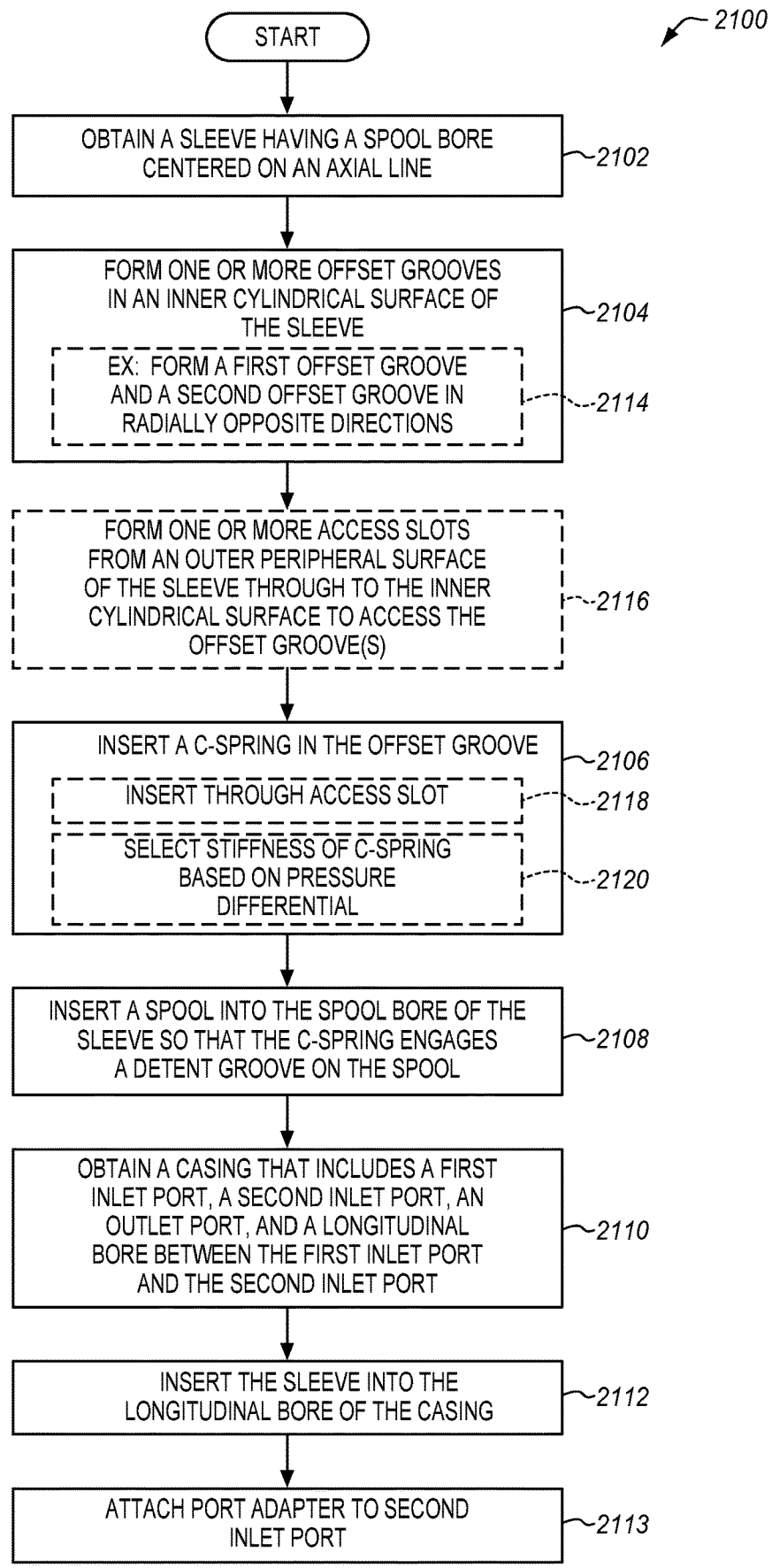
FIG. 21 is a flow chart illustrating a method of fabricating a shuttle valve in an illustrative embodiment.

FIG. 21 is a flow chart illustrating a method 2100 of fabricating a shuttle valve in an illustrative embodiment. The steps of method 2100 will be described with respect to shuttle valve 100 in the above figures, although one skilled in the art will understand that the methods described herein may be performed to fabricate other shuttle valves. The steps of the methods described herein are not all inclusive and may include other steps not shown. The steps for the flow charts shown herein may also be performed in an alternative order.

In step 2102, a sleeve 122 is obtained or provided having a spool bore 901 centered on an axial line 125 (see also, FIG. 9). One or more offset grooves 138 are cut, machined, or otherwise formed in an inner cylindrical surface 1006 of sleeve 122 that is defined by spool bore 901 (step 2104). An offset groove 138 is centered on an axial line 1311/1312 that is offset from the axial line 125 of sleeve 122 (see also, FIG. 13). In one embodiment, a first offset groove 138-1 and a second offset groove 138-2 may be formed in radially opposite directions (optional step 2114). Also, one or more access slots 924 may also be cut, machined, or otherwise formed from an outer peripheral surface 910 of sleeve 122 through to inner cylindrical surface 1006 to access the offset groove(s) 138 (optional step 2116). The access slots 924 may be formed between the first offset groove 138-1 and the second offset groove 138-2 as discussed above.

Figure 22:
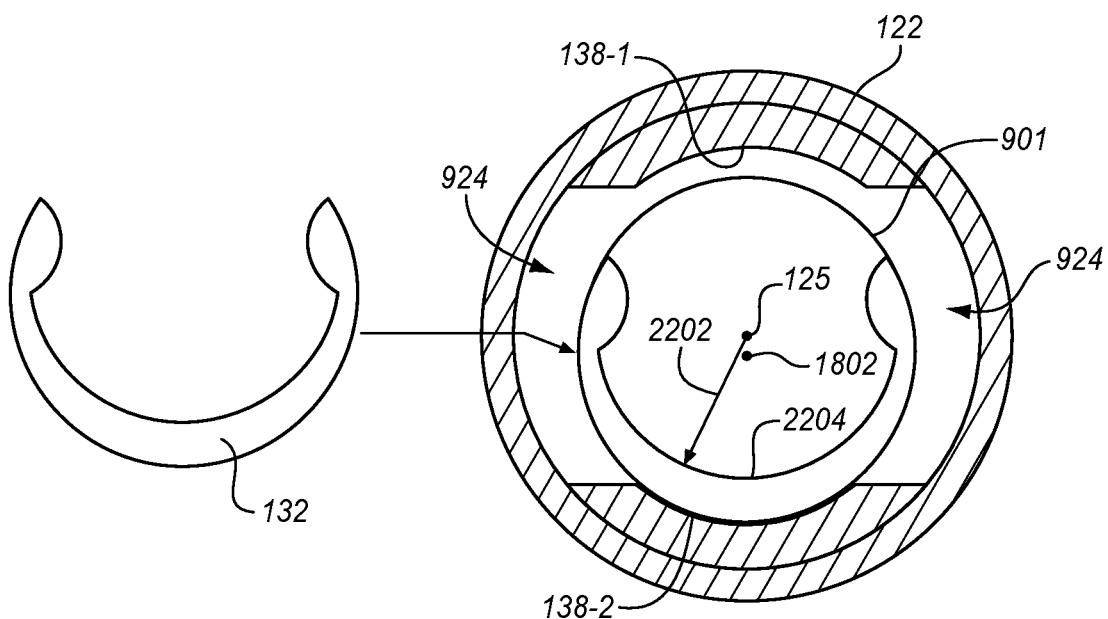
FIG. 22 is a cross-sectional view illustrating a C-spring being inserted in an offset groove in an illustrative embodiment.

A C-spring 132 is inserted in the offset groove 138 (step 2106). FIG. 22 is a cross-sectional view illustrating a C-spring 132 being inserted in the offset groove 138 in an illustrative embodiment. C-spring 132 may be inserted through an access slot 924 in sleeve 122, and into one of the offset grooves 138 (step 2118). When positioned within an offset groove 138, the center axis 1802 of C-spring 132 is offset from axial line 125. The resulting distance 2202 from axial line 125 to the inner surface 2204 of C-spring 132 may be greater than the diameter 1602 of spool 124. As described above, different C-springs 132 may be used in shuttle cartridge 120. Thus, the stiffness 1810 of C-spring 132 inserted in offset groove 138 may be selected based on a pressure differential (i.e., between inlet pressure 210/211) applied to shuttle valve 100 (step 2120) for a particular application.

Figure 23:
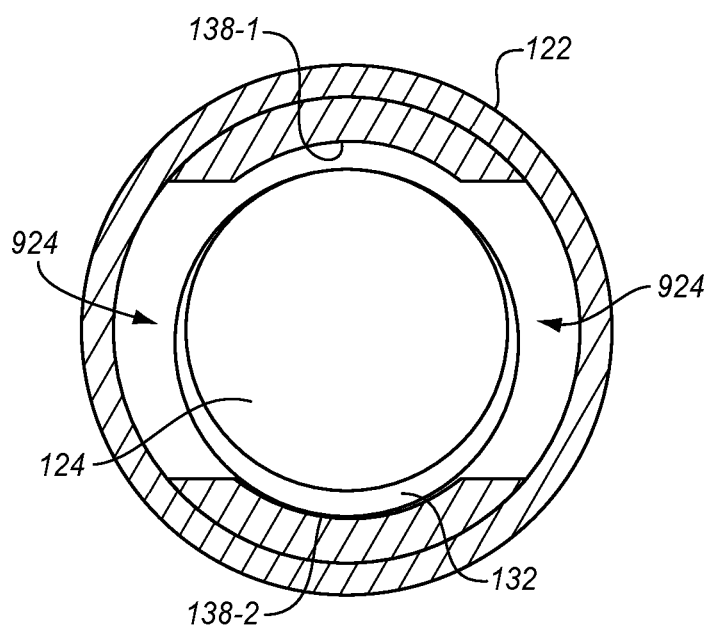
FIG. 23 is a cross-sectional view illustrating a spool assembled in a sleeve in an illustrative embodiment.

In FIG. 21, a spool 124 is inserted into the spool bore 901 of sleeve 122 so that the C-spring 132 engages a detent groove 126 on the spool 124 (step 2108). FIG. 23 is a cross-sectional view illustrating a spool 124 assembled in sleeve 122 in an illustrative embodiment. This figure shows C-spring 132 seated in offset groove 138-2. When spool 124 is initially inserted into the spool bore 901 of sleeve 122, ends 1704 of C-spring 132 will elastically expand so that spool 124 can slide into spool bore 901. Spool 124 may be inserted until C-spring 132 engages a detent groove 126 on spool 124.

The above steps may be used to fabricate and assemble the shuttle cartridge 120 of shuttle valve 100. With C-spring 132 engaging a detent groove 126 on spool 124, shuttle cartridge 120 will not unintentionally disassemble. Stoppers 2010 may also be inserted into ends of sleeve 122, as shown in FIG. 20.

In additional steps of method 2100, a casing 102 is obtained or provided for the shuttle valve 100 that includes a first inlet port 110, a second inlet port 111, an outlet port 112, and a longitudinal bore 702 between the first inlet port 110 and the second inlet port 111 (step 2110). Sleeve 122 (i.e., the complete shuttle cartridge 120) is inserted into the longitudinal bore 702 of the casing 102 (step 2112). For example, shuttle cartridge 120 may be inserted through inlet port 111 as shown in FIG. 20. A port adapter 420 is attached or connected to inlet port 111 (step 2113). Thus, sleeve 122 is disposed between an interface surface 750 and an end 2004 of port adapter 420 (see also, FIG. 20). Method 2100 may include additional steps, such as attaching seal members 2002 to ends of sleeve 122, fastening or coupling hose fittings 410-412 to shuttle valve 100 so that it may be installed in a fluid power system, etc.

Figure 24:
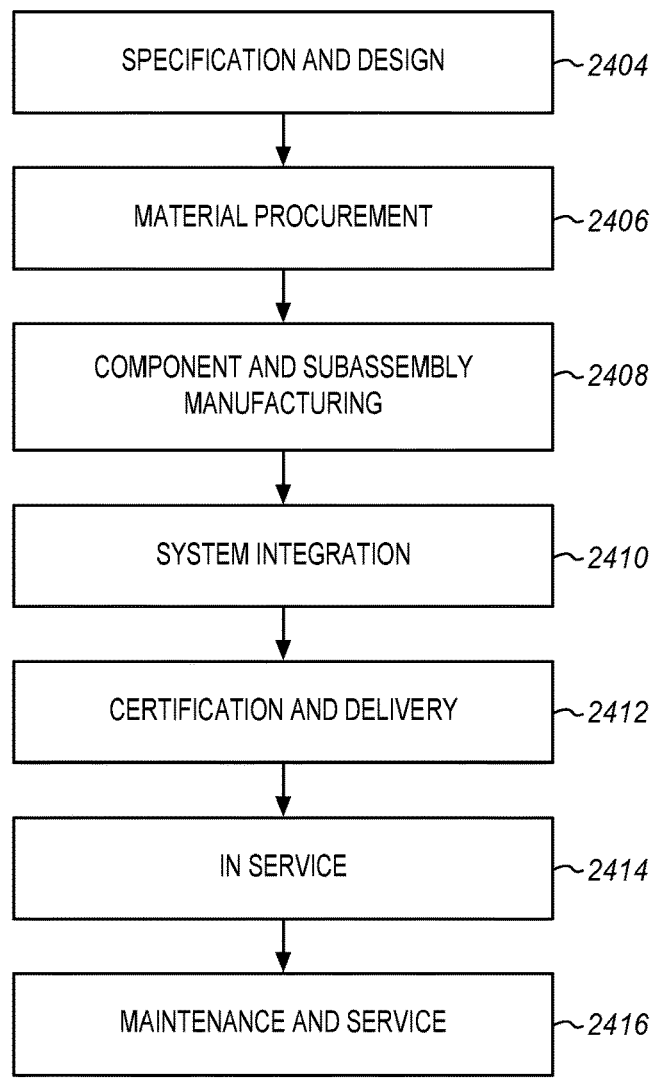
FIG. 24 is a flow chart illustrating an aircraft manufacturing and service method in an illustrative embodiment.
Figure 25:
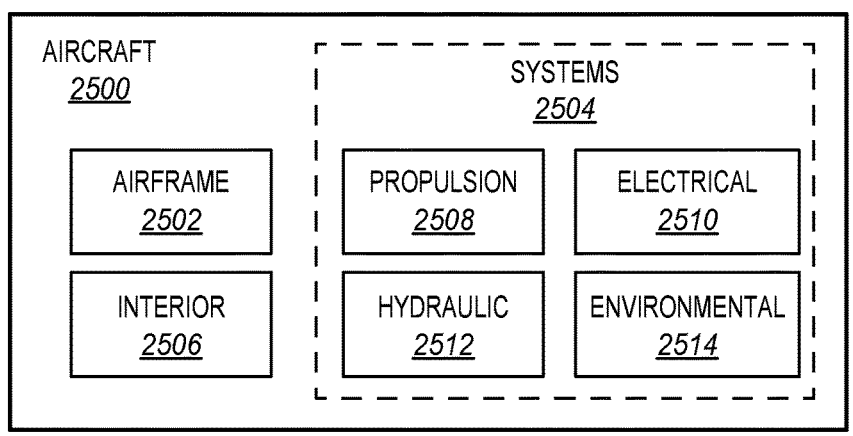
FIG. 25 is a schematic diagram of an aircraft in an illustrative embodiment.

The embodiments of the disclosure may be described in the context of an aircraft manufacturing and service method 2400 as shown in FIG. 24 and an aircraft 2500 as shown in FIG. 25. During pre-production, exemplary method 2400 may include specification and design 2404 of aircraft 2500, and material procurement 2406. During production, component and subassembly manufacturing 2408 and system integration 2410 of aircraft 2500 takes place. Thereafter, aircraft 2500 may go through certification and delivery 2412 in order to be placed in service 2414. While in service by a customer, aircraft 2500 is scheduled for routine maintenance and service 2416 (which may also include modification, reconfiguration, refurbishment, and so on).

Each of the processes of method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 25, aircraft 2500 produced by exemplary method 2400 may include an airframe 2502 with a plurality of systems 2504 and an interior 2506. Examples of high-level systems 2504 include one or more of a propulsion system 2508, an electrical system 2510, a hydraulic system 2512, and an environmental system 2514. Any number of other systems may be included. Although an aerospace example is shown, the principles described in this specification may be applied to other industries, such as the automotive industry.

Apparatus and methods embodied herein may be employed during any one or more of the stages of the production and service method 2400. For example, components or subassemblies corresponding to production process 2408 may be fabricated or manufactured in a manner similar to components or subassemblies produced while aircraft 2500 is in service. Also, one or more apparatus embodiments, method embodiments, or a combination thereof may be utilized during the production stages 2408 and 2410, for example, by substantially expediting assembly of or reducing the cost of aircraft 2500. Similarly, one or more of apparatus embodiments, method embodiments, or a combination thereof may be utilized while aircraft 2500 is in service, for example and without limitation, to maintenance and service 2416.

Although specific embodiments were described herein, the scope is not limited to those specific embodiments. Rather, the scope is defined by the following claims and any equivalents thereof.

The invention claimed is:

1. A shuttle valve, comprising:
a casing having a first inlet port, a second inlet port, and an outlet port;
a sleeve disposed between the first inlet port and the second inlet port;
a spool slidable within the sleeve along an axial line, and having a plurality of detent grooves; and
a C-spring;
wherein the sleeve has a spring retaining portion that includes at least one offset groove that is radially offset from the axial line;
wherein the C-spring is disposed in the offset groove, and directly engages one of the detent grooves.

2. The shuttle valve of claim 1 wherein:
the spring retaining portion includes:
a first offset groove radially offset from the axial line; and
a second offset groove radially offset from the axial line;
wherein the first offset groove and the second offset groove are in radially opposite directions.

3. The shuttle valve of claim 2 wherein:
the spring retaining portion includes:
access slots disposed between the first offset groove and the second offset groove.

4. The shuttle valve of claim 1 wherein:
the C-spring comprises:
a C-shaped body with open ends; and
prongs disposed towards the ends that project radially inward.

5. The shuttle valve of claim 4 wherein:
the C-spring elastically expands to disengage from the one of the detent grooves when a pressure differential at the first inlet port and the second inlet port exceeds a threshold.

6. The shuttle valve of claim 1 wherein:
a stiffness of the C-spring is selected based on a pressure differential applied to the shuttle valve.

7. The shuttle valve of claim 1, wherein
the shuttle valve is implemented in an aircraft.

8. A shuttle cartridge of a shuttle valve, the shuttle cartridge comprising:
a sleeve having a spool bore;
a spool slidable within the spool bore along an axial line, and having a plurality of detent grooves; and
a spring having a C-shaped body with open ends, and further having prongs disposed towards the ends that project radially inward;
wherein the spring is disposed in an offset groove of the sleeve that is radially offset from the axial line, with the prongs directly engaging one of the detent grooves.

9. The shuttle cartridge of claim 8 wherein the sleeve includes:
a first offset groove radially offset from the axial line; and
a second offset groove radially offset from the axial line in a radially opposite direction than the first offset groove.

10. The shuttle cartridge of claim 9 wherein the sleeve includes:
access slots disposed between the first offset groove and the second offset groove.

11. The shuttle cartridge of claim 8 wherein:
each of the prongs is rounded radially inward between one of the ends and the C-shaped body, and is rounded along a thickness of the spring.

12. The shuttle cartridge of claim 8 wherein:
the spring is flat in an axial direction.

13. The shuttle cartridge of claim 8 wherein:
the sleeve includes a stopper recess at each end of the sleeve; and
the shuttle cartridge further includes a stopper disposed within the stopper recess.

14. A method of fabricating a shuttle valve, the method comprising:
obtaining a sleeve having a spool bore centered on an axial line;
forming at least one offset groove in an inner cylindrical surface of the sleeve that is defined by the spool bore, wherein the offset groove is radially offset from the axial line;
inserting a C-spring in the offset groove; and
inserting a spool into the spool bore of the sleeve so that the C-spring directly engages a detent groove on the spool.

15. The method of claim 14 further comprising:
obtaining a casing for the shuttle valve that includes a first inlet port, a second inlet port, an outlet port, and a longitudinal bore between the first inlet port and the second inlet port;
inserting the sleeve into the longitudinal bore of the casing through the second inlet port; and
attaching a port adapter to the second inlet port.

16. The method of claim 14 wherein forming the at least one offset groove in the inner cylindrical surface of the sleeve comprises:
forming a first offset groove and a second offset groove in the inner cylindrical surface that are in radially opposite directions.

17. The method of claim 16 further comprising:
forming access slots between the first offset groove and the second offset groove.

18. The method of claim 17 wherein inserting the C-spring in the offset groove comprises:
inserting the C-spring through one of the access slots and into the first offset groove or the second offset groove.

19. The method of claim 14 wherein inserting the C-spring in the offset groove comprises:
selecting a stiffness of the C-spring based on a pressure differential applied to the shuttle valve.

20. The method of claim 14 wherein:
the shuttle valve is manufactured as a component of an aircraft.

\* \* \* \* \*